Sept. 19, 1933.   O. L. HERRON   1,927,033
WINDSHIELD
Filed Sept. 12, 1931
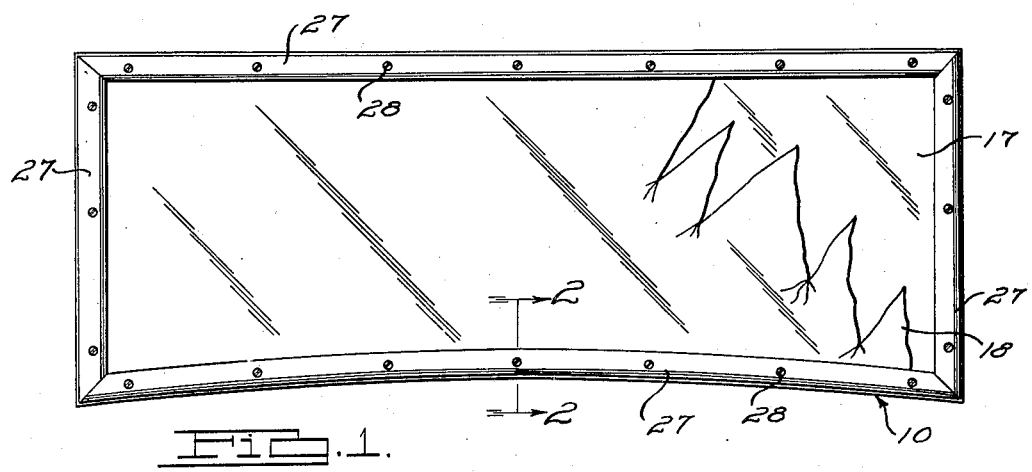
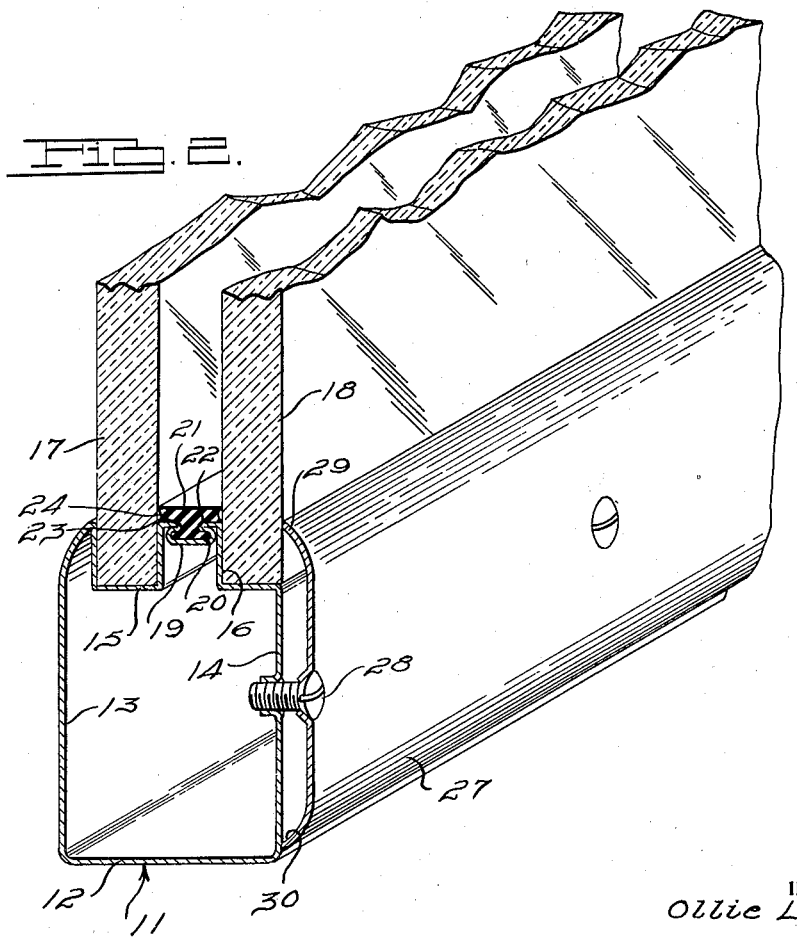
INVENTOR
Ollie L. Herron
BY
ATTORNEYS Patented Sept. 19, 1933

1,927,033

UNITED STATES PATENT OFFICE 1,927,033

WINDSHIELD

Ollie L. Herron, Chicago, Ill., assignor of thirty per cent to Anna L. Herron, twenty per cent to Joseph B. Zimmers, and thirty per cent to Wilma M. Zimmers, all of Chicago, Ill.

Application September 12, 1931
Serial No. 562,493

7 Claims. (Cl. 296—84)

The invention relates to windshields and it has particular relation to a transparent windshield for motor vehicles or the like.

The principal objects of the invention are to provide an improved windshield for motor vehicles or the like, that eliminates condensing of moisture and frost which frequently collect on the shield and impair the vision therethrough; to provide an improved windshield in which two sheets of glass are spaced and the space between them sealed, and wherein one glass can readily be removed when its use is not necessary; to provide a novel form of frame for accommodating two sheets of glass in the above mentioned manner; and to provide a novel means for sealing the space between the sheets of glass.

For a better understanding of the invention reference may be had to the accompanying drawing, forming a part of the specification, wherein:

Figure 1 is a front elevational view of a windshield constructed according to one form of the invention;

Fig. 2 is a fragmentary, cross-sectional and perspective view on a larger scale, taken substantially along line 2—2 of Fig. 1, illustrating the manner in which the glass is associated with the windshield frame.

As shown by Fig. 1, the frame of the windshield indicated at 10 is of generally rectangular shape, corresponding to the usual shape of windshields used in conjunction with motor vehicles. However, it should be understood that the shape of the shield may vary and, moreover, it may be so constructed that it can be used in various capacities, and need not be limited to use on a motor vehicle. Referring to Fig. 2, the frame 10 comprises an annular hollow element 11 constructed of sheet metal which may be formed from sections welded or otherwise rigidly connected, or an elongated section bent into the shape desired and the ends thereof connected by welding or by any other suitable means. A member of this character also may be formed initially into an annular frame without any subsequent welding or connecting of parts. The member 11 comprises a base portion 12, a front part 13 and a rear part 14, the latter parts being disposed in substantially parallel relation, and extending inwardly of the frame. However, the part 14 may be at the front and the part 13 at the rear if this is desired.

At their outer edges, parts 13 and 14 are so shaped as to provide a channel 15 adjacent part 13, and a step shape recess 16 adjacent part 14, of angular shape, which opens to the rear side of the shield. The channel 15 is adapted to receive the edge of the front glass indicated at 17, while the recess 16 is adapted to receive the rear glass indicated at 18. Between the channel and recess, the metal is formed as indicated at 19 to provide a pocket 20 for receiving a part of a rubber sealing element 21. Outwardly of the pocket the metal extends inwardly as indicated at 22 and 23 to provide a restricted opening for retaining the rubber element in the pocket. Outwardly of the restricted opening the sealing member 21 has oppositely projecting edge portions which contact respectively with the sheets of glass 17 and 18 for sealing the space between the glass as well as preventing vibration thereof. The edge surfaces of the sealing element which contact with the glass are recessed in a concave manner as indicated at 24 for the purpose of creating a partial vacuum between the rubber and the glass when the rubber is compressed between them. This causes the edges of the rubber to seal the space between the two sheets of glass in a more positive manner. The sealing element may be located in the pocket 20 by deforming it sufficiently that it will project through the restricted opening and then allowing it to expand laterally into the pocket.

The glass 18 is maintained in the recess 16 by a metal covering member 27 secured to the part 14 by means of screws 28. Opposite edges of the covering element as indicated at 29 and 30, project inwardly against the glass and part 14 respectively, and when the screws 28 are tightened, the intermediate portion of the cover is pressed inwardly which causes the edge 29 to be resiliently pressed against the glass, and the glass in turn pressed into recess 16 in a resilient manner. Hence the glass 18 cannot become loose and vibrate.

The glass 18, particularly in cold weather, will be used and the space between the two pieces of glass being sealed by the rubber element 21, will create a sort of dead air pocket which will prevent condensation of moisture and frosting on the side of the glass 18 inwardly of the vehicle. In warmer weather when it is desired to use the glass 17 only, the covering members 27 are removed, which permits removal of the glass 18. When the cover 27 and the glass 18 are removed, the windshield still will have an attractive appearance, and practically will not be distinguishable from standard forms of windshields.

It is apparent from the foregoing description, that the windshield is so constructed that it can be used with one or two pieces of glass and that under either set of conditions, it has an attractive appearance. Moreover, when the glass 18 is in use, the sealed air space between the two pieces of glass prevents frosting and condensing of moisture on the glass, and hence the windshield can be maintained in a clear condition, and vision therethrough not impaired. While preferably the glass 18 will be located at the inner side of the vehicle, it is obvious that it can be used on the outside or front side of the vehicle if this is desired.

Although only one form of the invention has been described and illustrated in detail, it will be apparent to those skilled in the art that various modifications may be made without departing from the scope of the appended claims.

I claim:

1. A windshield comprising a frame, spaced shields mounted in the frame, an annular pocket formed in the frame between the shields and having a restricted opening, a resilient sealing element in the pocket and having an intermediate portion complementary to the restricted opening, said element outwardly of the opening having laterally directed portions extending laterally beyond the opening and engaging both shields.

2. A windshield comprising a frame, spaced shields in the frame, an annular pocket formed in the frame between the shields and having a restricted opening, and a resilient sealing element mounted in the pocket and projecting through the restricted opening, said element having laterally directed portions outwardly of the pocket for engaging both shields, the faces of the element engaging the shield being recessed to secure a vacuum retained engagement between the element and shields.

3. In combination, a hollow frame member constructed of sheet metal, one wall of the member having a channel for receiving and retaining a glass or shield, said wall also having a recess spaced from the channel for receiving a second shield, the wall between the channel and recess having a third recess, and a resilient sealing member disposed in said third recess and having portions adapted to engage the adjacent sides of the shields when the latter are in place in the channel and recess, respectively.

4. In combination, a hollow frame member constructed of sheet metal, one wall of the member having a channel for receiving and retaining a glass or shield, said wall also having an angular recess spaced from the channel, which is open at one side for retaining a second shield, means secured to the member and adapted to extend over the open side of the recess for releasably retaining the second shield therein, said wall between the channel and recess having a third recess, and resilient sealing means disposed in said third recess and having portions adapted to engage adjacent sides of the shields when the latter are disposed in the channel and recess, respectively.

5. In combination, a hollow frame member constructed of sheet metal, one wall of the member having a channel for receiving and retaining a glass or shield, said wall also having an angular recess spaced from the channel and open at one side for receiving a second shield, releasable means connected to the member and extending over the open side of the recess for releasably engaging the second shield and holding it in the recess, said wall between the channel and recess having a third recess provided with a restricted entry or opening, and a resilient sealing member disposed in said recess and having laterally directed portions exteriorly of the restricted entry or opening for engagement with the shields when the latter are disposed in the channel and recess therefor, respectively.

6. A windshield comprising a frame, spaced shields mounted in the frame, and a sealing element between the shields and extending around their edges for sealing the space between them, said element having edge faces engaging the shields respectively, and such edge faces having recesses therein to obtain vacuum creating contact with the shields.

7. In combination, a hollow frame member constructed of sheet metal, one wall of the member having a recess for receiving and retaining a glass or shield, said wall also having a recess spaced from the first recess for receiving a second shield, the wall between the said recesses having a third recess, and a resilient sealing member disposed in said third recess and having portions adapted to engage the adjacent sides of the shields when the latter are in place in said first and second recesses respectively.

OLLIE L. HERRON.